US012811267B2

(12) United States Patent
Liu

(10) Patent No.: US 12,811,267 B2
(45) Date of Patent: Nov. 24, 2026

(54) TEMPERATURE COMPENSATED STRUCTURE FOR RADIO FREQUENCY DEVICES AND TEMPERATURE COMPENSATED RADIO FREQUENCY DEVICE

(71) Applicant: ACENTURY INC., Richmond Hill (CA)

(72) Inventor: Xun Liu, Richmond Hill (CA)

(73) Assignee: Acentury Inc., Richmond Hill (CA)

( * ) Notice: Subject to any disclaimer, the term of this patent is extended or adjusted under 35 U.S.C. 154(b) by 188 days.

(21) Appl. No.: 18/832,907

(22) PCT Filed: Mar. 24, 2023

(86) PCT No.: PCT/CA2023/050404
§ 371 (c)(1),
(2) Date: Jul. 24, 2024

(87) PCT Pub. No.: WO2023/184019
PCT Pub. Date: Oct. 5, 2023

(65) Prior Publication Data

US 2025/0107020 A1 Mar. 27, 2025

Related U.S. Application Data

(60) Provisional application No. 63/324,610, filed on Mar. 28, 2022, provisional application No. 63/324,036, filed on Mar. 26, 2022.

(51) Int. Cl.
*H01P 7/06* (2006.01)
*H01P 7/04* (2006.01)

(52) U.S. Cl.
CPC . *H01P 7/06* (2013.01); *H01P 7/04* (2013.01)

(58) Field of Classification Search
CPC .................................... H01P 7/04; H01P 7/06
(Continued)

(56) References Cited

U.S. PATENT DOCUMENTS 5,304,968 A 4/1994 Ohtonen et al.
6,396,366 B1 * 5/2002 Raty ......................... H01P 7/04 333/222

(Continued)

FOREIGN PATENT DOCUMENTS

EP 0540360 5/1993
WO 2000010220 2/2000

(Continued)

OTHER PUBLICATIONS

Lisi, Marco. (2014). A Review of Temperature Compensation Techniques for Microwave Resonators and Filters (Micro and Millimetre Wave Technology and Techniques Workshop 2014At: Estec, Noordwijk, The Netherlands).

(Continued)

*Primary Examiner* — Andrea Lindgren Baltzell
*Assistant Examiner* — Victor Cole

(57) ABSTRACT

A radio frequency device, for example, a VHF (very-high-frequency) or UHF (ultra-high-frequency) filter, combiner or a microwave band device filter, having a temperature compensation structure, used for telecommunication applications, is disclosed. Thermal frequency drift is minimized by suitably selecting materials of different thermal heat expansion properties and careful placement of different components of a temperature compensation structure.

17 Claims, 9 Drawing Sheets

(58) Field of Classification Search
USPC .......................................... 333/227, 229, 234
See application file for complete search history.

(56) References Cited

U.S. PATENT DOCUMENTS

| | | | | |
|---|---|---|---|---|
| 2007/0241843 | A1 | 10/2007 | D'Ostilio | |
| 2014/0340169 | A1 * | 11/2014 | Subedi ................. | H01P 1/2136 333/132 |

FOREIGN PATENT DOCUMENTS

| | | |
|---|---|---|
| WO | 2000076019 | 12/2000 |
| WO | 2006012055 | 2/2006 |
| WO | 2006058965 | 6/2006 |

OTHER PUBLICATIONS

Wang, C., & Zaki, K.A. (1999). Temperature compensation of combline resonators and filters. 1999 IEEE Mtt-S International Microwave Symposium Digest (Cat. No.99CH36282), 3, 1041-1044 vol. 3.

Y. Ren, Q. Wang, Y. Tan and G. Wu, "Temperature compensation of cavity resonators," The 2012 International Workshop on Microwave and Millimeter Wave Circuits and System Technology, Chengdu, China, 2012, pp. 1-4.

* cited by examiner

TEMPERATURE COMPENSATED STRUCTURE FOR RADIO FREQUENCY DEVICES AND TEMPERATURE COMPENSATED RADIO FREQUENCY DEVICE

FIELD OF INVENTION

The invention relates to a compact radio frequency device, having a temperature compensation structure, used for telecommunication applications.

BACKGROUND OF INVENTION

Radio frequency devices, such as VHF (very-high-frequency) or UHF (ultra-high-frequency) devices, are generally made of metal components. In industrial applications, such devices are generally installed outdoors and are subject to seasonal and daily environmental temperature changes, which can be in a very large range. The internal components may also experience significant temperature changes due to variation of loads applied to such devices. For example, increase of load can cause significant heating and therefore temperature increase.

The resonant frequencies or frequency bands of such radio frequency devices are generally determined by the devices' physical dimensions. Any temperature variation caused changes in physical dimensions tend to cause frequency drift, thus adversely affect the performance of the radio frequency devices. With the increased importance of public safety application, there are more demands for radio frequency devices that can work at even higher frequencies but within significantly narrower frequency bands. Frequency drifts in such devices become even less tolerable. It is therefore desirable to improve a radio frequency device's temperature drift capabilities, to provide radio frequency devices that can have minimum frequency drifts due to temperature variations.

There have been proposals of adding extra heat compensation structures to a microwave filter. But such additions tend to increase the overall size of the device. There has also been proposals utilizing special materials of a low coefficient of thermal expansion (CTE) for constructing the radio frequency devices, such as Invar™. However, using these special materials generally would increase material cost (and may increase manufacturing cost, too).

The forgoing creates challenges and constraints for providing a low cost solution to construct a radio frequency device that is compact and suffers minimum thermal frequency drift. It is an object of the present invention to mitigate or obviate at least one of the above mentioned disadvantages.

SUMMARY OF INVENTION

The present invention relates to a radio frequency device, for example, a VHF (very-high-frequency) or UHF (ultra-high-frequency) filter, combiner or microwave band device, such as a microwave filter, having a temperature compensation structure, used for telecommunication applications. By suitably selecting conductor and dielectric materials of different thermal expansion properties and careful placement and construction of different components of the temperature compensation structure to promote enhanced thermal expansion effects, the overall frequency drift can be compensated by different frequency drifts caused by individual components and a desirable thermal compensated radio frequency device having a compact size may be obtained.

In a first aspect of the invention, a radio frequency device that includes a temperature compensation structure for minimizing thermal frequency drift. The radio frequency device has a casing made of a first conductive material of a first coefficient of thermal expansion (CTE) value, the casing having a bottom wall, a top wall and one or more side walls between the bottom wall and the top wall to form an enclosed cavity, an inner post made of a second conductive material of a second CTE value disposed inside the enclosed cavity, the inner post having a bottom end and a top end opposite the bottom end, the inner post being attached and electrically connected to the bottom wall at the bottom end, the top end being electrically disconnected from the casing, and a temperature compensation structure arranged at the top end of the inner post and disposed inside the enclosed cavity. The temperature compensation structure includes a lower plate secured to and electrically attached to at least one side wall of the one or more side walls and at a height between the top end and the bottom end, the lower plate making no contact with the inner post, a middle disk secured to and electrically attached to the top end of the inner post, a covering plate securely attached around its periphery to the casing, and one or more dielectric blocks joining the middle disk to the covering plate, each one of the one or more dielectric blocks being partially embedded in the middle disk and having a non-embedded portion separating the middle disk from the covering plate at a gap distance. The lower plate, the middle disk and the covering plate are electrically conductive.

As a feature of this aspect of the invention, the radio frequency device may have one or more inner dividers, such as metal inner dividers, to divide the enclosed cavity into a plurality of inner chambers. Each inner divider may have a port connecting the neighboring inner chambers separated by the inner divider for coupling electromagnetic energy in the neighboring chambers. Each inner chamber may have an inner post and a temperature compensation structure disposed therein. The inner post is attached and electrically connected to the bottom wall at its bottom end and its top end is electrically disconnected from the casing. The temperature compensation structure in each inner chamber is arranged at the top end of the respective inner post. Each of the temperature compensation structures includes a lower plate, a middle disk, a covering plate, and one or more dielectric blocks joining the middle disk to the covering plate. The lower plate is secured to and electrically attached to at least one side wall of the one or more side walls and at a height between the top end and the bottom end of the inner post. The lower plate makes no contact with the inner post. The middle disk is secured to and electrically attached to the top end of the inner post. The covering plate is securely attached around its periphery to the casing.

As another feature of this aspect of the invention, the radio frequency device may have a frequency tuning mechanism. The frequency tuning mechanism includes at least one tuning rod (which may be a metal screw) movably supported by one side wall of the one or more side walls at a height of the middle disk. At least one middle disk of the one or more middle disks has a corresponding tuning slot formed thereon and extending inwardly from its periphery, such that the at least one tuning rod is partially disposed in the respective corresponding tuning slot and movable along the length of the tuning slot.

As yet another feature, heat expansion of volume of the partially embedded portion of the one or more dielectric blocks inside the middle disk is restricted by the middle disk. The volume of the partially embedded portion and volume of the non-embedded portion may have a volume ratio of at least 0.5:1, or a ratio of at least 1:1. As another feature, the dielectric blocks are made of a dielectric material that has a CTE value larger than that of the middle disk, and in particular, may be made of Teflon™.

As yet another feature, change in volume of the enclosed cavity due to temperature change introduces a first frequency drift DF_0, change in distance between the middle disk and the lower plate due to the temperature change introduces a second frequency drift DF_$m$,$l$, change in coupling between the upper covering plate and the middle plate due to the temperature change introduces a third frequency drift DF_$m$,$u$, changes in volume of the dielectric blocks due to the temperature change introduces a fourth frequency drift DF_$d$, and changes in relative position between the tuning slot and the tuning rod introduces a fifth frequency drift DF_$r$, and a minimized combination of frequency drift from the first frequency drift, the second frequency drift, the third frequency drift, the fourth frequency drift, and the fifth frequency drift is selected.

As another feature, the height of the inner post, the height of the lower plate's attachment location to the casing, the total volume of the one or more dielectric blocks are selected to minimize the minimized combination of frequency drift.

In another aspect of the invention, a radio frequency device that includes a temperature compensation structure for minimizing thermal frequency drift is provided. The radio frequency device comprises a casing made of a first material, having a bottom wall, one or more side walls and a top wall, the bottom wall, the one or more side walls and the top wall enclosing an enclosed cavity, an conductive inner post made of a second material, disposed inside the enclosed cavity, the conductive post having a bottom end and a top end opposite the bottom end, the inner post being attached to an internal wall of the casing at the bottom end, and a temperature compensation structure arranged at the other end of the inner post and disposed inside the enclosed cavity, the temperature compensation structure comprising a lower conductor plate secured to and electrically attached to the internal wall of the casing and at a height between the top end and the bottom end, a middle conductor disk secured to and electrically attached to the top end of the inner post, an covering plate securely attached around its periphery to the side walls, and one or more dielectric blocks partially embedded in the middle disk and joining the middle disk to the covering plate. The height of the inner post, the height of the lower plate's attachment and total volume of the one or more dielectric blocks are selected to minimize frequency drift around working frequency when taking into account of CTE values of the first material and of the second material.

As one feature, the one or more side walls are made of aluminum, the inner post is made of copper and the dielectric blocks are made of Teflon™.

In other aspects the invention provides various combinations and subsets of the aspects and features described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
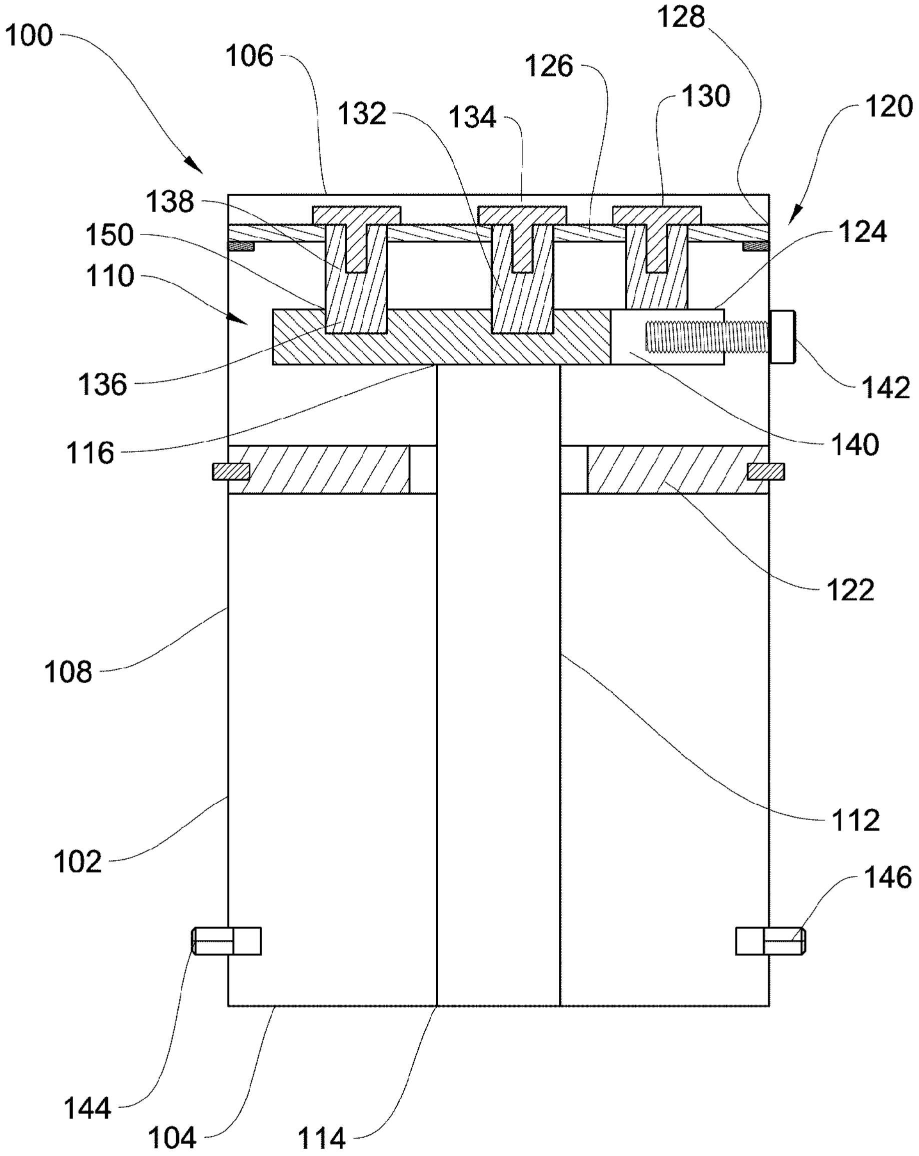
FIG. 1 is a diagram to illustrate a radio frequency device (e.g., a filter) having a temperature compensation structure.

The description which follows and the examples described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The present invention relates to a compact radio frequency device, for example, a VHF (very-high-frequency) or UHF (ultra-high-frequency) filter, combiner or microwave band device, such as a microwave filter, having a temperature compensation structure, used for telecommunication applications. By suitably selecting conductor and dielectric materials of different thermal heat expansion properties and careful placement and construction of different components of the temperature compensation structure to promote enhanced heat expansion effects, the overall frequency drift can be compensated by different frequency drifts caused by individual components and a desirable heat compensated radio frequency device having a compact size may be obtained.

Referring to FIG. 1, there is shown a radio frequency device 100 that includes a temperature compensation structure for minimizing thermal frequency drift. The radio frequency device may be a filter, a combiner or a resonator that is generally used in the field of telecommunication. The radio frequency device has a conductive outside casing 102 that is made of a first conductive material, such as aluminum. The first conductive material has a first coefficient of thermal expansion (CTE) value. In the case of aluminum, the first CTE has a value of linear CTE of about 23.1 ppm/° C. at 20° C. The casing has a bottom wall 104, a top wall 106 and one or more side walls 108 located between and joining the bottom wall 104 and the top wall 106. The bottom wall, the one or more side walls and the top wall together enclose an enclosed volume to form an enclosed cavity 110. The radio frequency device also has a conductive inner post 112 that is made of a second conductive material, such as copper. The second conductive material has a second CTE value. In the case of copper, the second CTE has a value of about 17 ppm/° C. at 20° C., which is smaller than that of aluminum. Of course, as will be appreciated, the CTE values are determined by the first and second materials selected for the casing and the inner post. Selection of different materials will give different CTE values. The conductive inner post 112 is disposed inside the enclosed cavity 110. The conductive inner post has a bottom end 114 and a top end 116 opposite the bottom end. The inner post 112 is attached to and electrically connected to the bottom wall 104, i.e., the internal wall of the casing at the bottom end. The top end 116 of the inner post does not contact the casing 102 and is thus electrically disconnected from the casing, i.e., forms an open circuit with the casing at the top end.

The radio frequency device 100 has a temperature compensation structure 120 arranged at or in the vicinity of the top end 116 of the inner post and disposed inside the enclosed cavity. The temperature compensation structure 120 has a lower plate 122, a middle disk 124, and a covering plate 126. The lower plate, the middle disk and the covering plate are electrically conductive and made of conductive materials which may be the same materials as the first conductive material, the second conductive material, or some other conductive materials. They are thus conductors. The lower conductor plate 122 is attached to at least one side wall 108 of the casing 102 and is thus electrically connected to the casing. However, the lower conductor plate 122 makes no contact with the inner post 112. For example, the lower conductor plate may have a central hole for the inner post 112 to pass therethrough. The lower conductor plate 122 is located at a height between the top end 116 and the bottom end 114. The middle conductor disk 124 is secured, i.e., mounted to and electrically attached to the top end 116 of the inner post 112. The upper covering plate 126 is securely attached around its periphery 128 to the casing 102, which have a brim extended from the one or more side walls to support the upper covering plate 126 at its periphery 128. The temperature compensation structure 120 also has one or more dielectric blocks 130 between the middle disk 124 and the upper covering plate 126. These dielectric blocks 130 may be in the form of nuts 132 and screws 134 to join the middle disk 124 to the upper covering plate 126. Each of the dielectric blocks 130 may be partially embedded in the middle disk, i.e., having an embedded portion 136 embedded in the middle disk and a non-embedded portion 138 extending from the middle disk 126 and thus separating the middle disk from the covering plate at a gap distance.

The radio frequency device 100 has a frequency tuning mechanism, for fine tuning the resonance frequency. Its location is carefully selected to minimize any frequency drift caused by this frequency tuning mechanism. The middle conductor disk 124 may have a tuning slot 140 formed thereon, which is generally along the radial direction and extending inwards from the periphery of the middle conductor disk 124. A frequency tuning rod, in the nature of a tuning screw 142, may be movably supported in a threaded hole formed on a side wall 108 of the casing, thus supported by the casing. The tuning screw 142 extends inwardly from the side wall and into the tuning slot 140 and thus is partially disposed in the tuning slot. As the tuning rod, or the tuning screw, moves further into or out of the tuning slot along the length of the tuning slot, the overall resonance frequency of the radio frequency device is changed, i.e., tuned. Similarly, when the relative height of the middle conductor disk 124 and the tuning screw 142 changes, for example when the inner post 112 which supports the middle conductor disk 124 and the casing 102 which supports the tuning rod 142 experience different heat expansion, the tuning rod 142 also moves into or out of the tuning slot 140 but generally keeps parallel to the length of the tuning slot, i.e., along a direction normal to the surface of the middle conductor disk. This movement also will change the overall resonance frequency of the radio frequency device 100, which is one of the heat induced frequency drifts.

In general, as the temperature changes, the casing 102, the inner post 112 and the temperature compensation structure 120 all will experience dimensional change, but at different rates due to their CTE values. To illustrate this and to simplify the description, the description of these changes will be about changes caused by temperate increase. As will be understood, when temperature decreases, the heat produced effect will be reversed.

Consider first, as the temperature increases, it will cause an increase of the volume of enclosed cavity 110. This leads to a first frequency drift DF_0. This is undesirable if this frequency drift is not controlled or compensated. This is because when this frequency drift is too large, such as due to extreme temperature changes, the resonant frequency may be shifted too much as to be outside the designed frequency band, rendering the radio frequency device inoperative for its designed purposes. This first frequency drift is thus to be compensated, with the temperature compensation structure described herein.

As the temperature increases, the casing, having a first CTE value, and the inner post, having a second CTE value, will have different expansion rates. The middle conductor disk 124 is mounted on the top of the inner post 112 and therefore its position inside the cavity will be determined by the expanded length of the inner post. The lower conductor disk 122 is secured to a location of the side wall 108 of the casing. Therefore, its position inside the cavity 110 will be determined proportionally by the new height of the expanded side wall. Because the inner post and the side wall expand at different rate, this will cause a change in the relative position of the middle conductor disk 124 and the lower conductor plate 122, i.e., the distance between these two conductors. This will introduce a frequency drift $DF_{m,\ell}$, the second frequency drift.

Similarly, as the temperature increases, the distance between the top 116 of the inner post and the top wall of the casing also will change. The upper covering plate 126 is secured at its periphery 128 to a brim or other supporting structure of the casing at a location near the top wall. At the same time, the upper covering plate 126 is joined to the middle conductive plate 124 by the dielectric blocks 130, which also sets the distance between the upper covering plate and the middle conductor plate generally in the middle region, or at least at the locations where the dielectric blocks joining the upper covering plate to the middle conductor plate. This will cause a change in electromagnetic coupling between the upper covering plate 126 and the middle conductor plate 124 and a corresponding third frequency drift, $DF_{m,u}$.

Additionally, each of the dielectric blocks 130, or at least some of the dielectric blocks, has a portion embedded in the middle conductor disk 124. As temperature increases, the volume expansion of this part is restricted by the middle conductor disk. The embedded portion 136 is disposed in a recessed hole 150 or cavity of the middle conductor disk. As the temperature increases, the volume of this recessed hole 150 or cavity does not increase, but generally decreases, due to the heat expansion of materials surrounding the recessed hole or cavity. Thus, the volume of the embedded part 136 generally cannot expand, or even may decrease due to the shrinking size of the recess hole 150. As a result, the volume of the non-embedded portion 138 of the dielectric block 130 may experience an enhanced increase. It is generally advantageous to select a dielectric material that has a CTE value larger than that of the middle conductor disk to further enhance the volume increase of the non-embedded portion 138, thus increasing the volume of dielectric materials between the upper covering plate 126 and the middle conductor plate 124. For example, the dielectric material may be Teflon™. Whether there is enhanced increase in volume of the non-embedded portion or not, the general increase of volume of dielectric material between the upper covering plate and the middle conductor plate will cause another frequency drift, i.e., a fourth frequency drift, DF_d.

Finally, as already described, the middle conductor disk 124 is mounted on the top end 116 of the inner post and therefore its position inside the cavity will be determined by the expanded length of the inner post 112. This therefore will change the location or height of the tuning slot 140 formed on the middle conductor disk 124. On the other hand, the tuning rod 142 is supported by a side wall 108 of the casing. Its location inside the cavity or its height will increase by a different amount due to the difference CTE value of the material of the casing 102. The tuning rod 142 thus will move into or out of the plane of the middle conductor disk 124. This causes a fifth frequency drift, DF_r.

As an input signal enters the radio frequency device 100 at its input port 144 and leaves the radio frequency device at its output port 146, the signal's frequency spectrum is shaped by the radio frequency device. Any frequency drift of the radio frequency device may adversely affect the signal quality. The overall frequency drift of the radio frequency device is the combined effect of all these frequency drifts, namely, the first frequency drift, DF_0, the second frequency drift DF_m,l, the third frequency drift DF_m,a, the fourth frequency drift DF_d and the fifth frequency drift DF_d. By introducing these other frequency drifts and minimizing the combined effect of all of these frequency drifts, the temperature induced frequency drift DF_0 can be compensated and the performance of the radio frequency device can be improved.

Of course, although generally these different frequency drifts are produced due to the structure and material selection of the temperature compensation structure, and are interlinked, they also may be separately adjusted. It is not necessary to include all of these frequency drifts in the radio frequency device. For example, it is entirely possible to rely on only some, but not all, of these frequency drifts to compensate the first frequency drift DF_0. For example, it is possible to omit the tuning rod, and thus compensate the first frequency drift DF_0 without the fifth frequency drift. It is also possible not to use a dielectric material having high CTE value to join the upper covering plate and the middle conductor plate, thus minimizing the effect of DF_d. The effect of DF_d can be further minimized by selecting a dielectric material not very ductile, to minimize the effect of enhanced volume expansion. Conversely, it is also possible to select a dielectric block having a size and property (such as large CTE value, sufficiently ductile, large variation in dielectric constant due to temperature change, among others) such that DF_d will have a significant contribution to the temperature compensation and dominate the overall compensation effect. Similar adjustment and selections also may be made on other frequency drifts in any desired manner.

Figure 2:
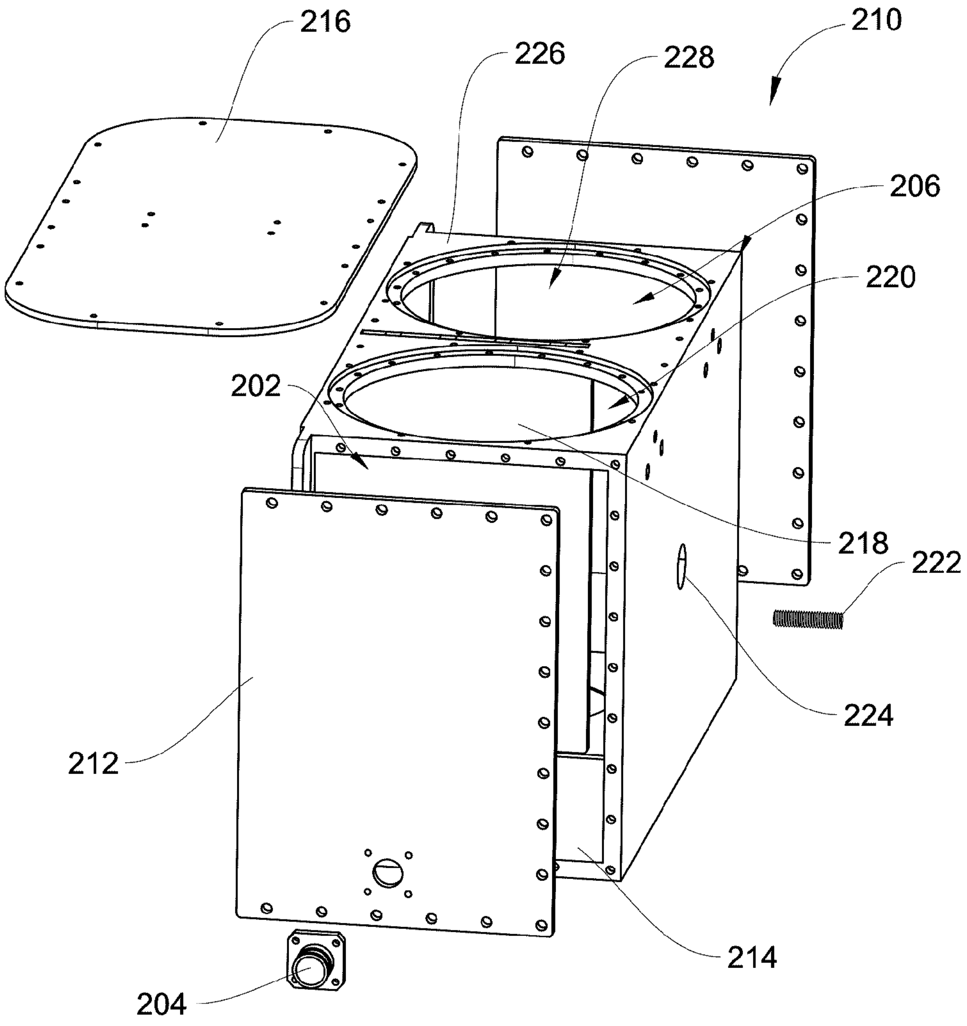
FIG. 2 shows in a perspective view a disassembled casing for a radio frequency device (e.g., a filter) having two internal chambers.
Figure 3:
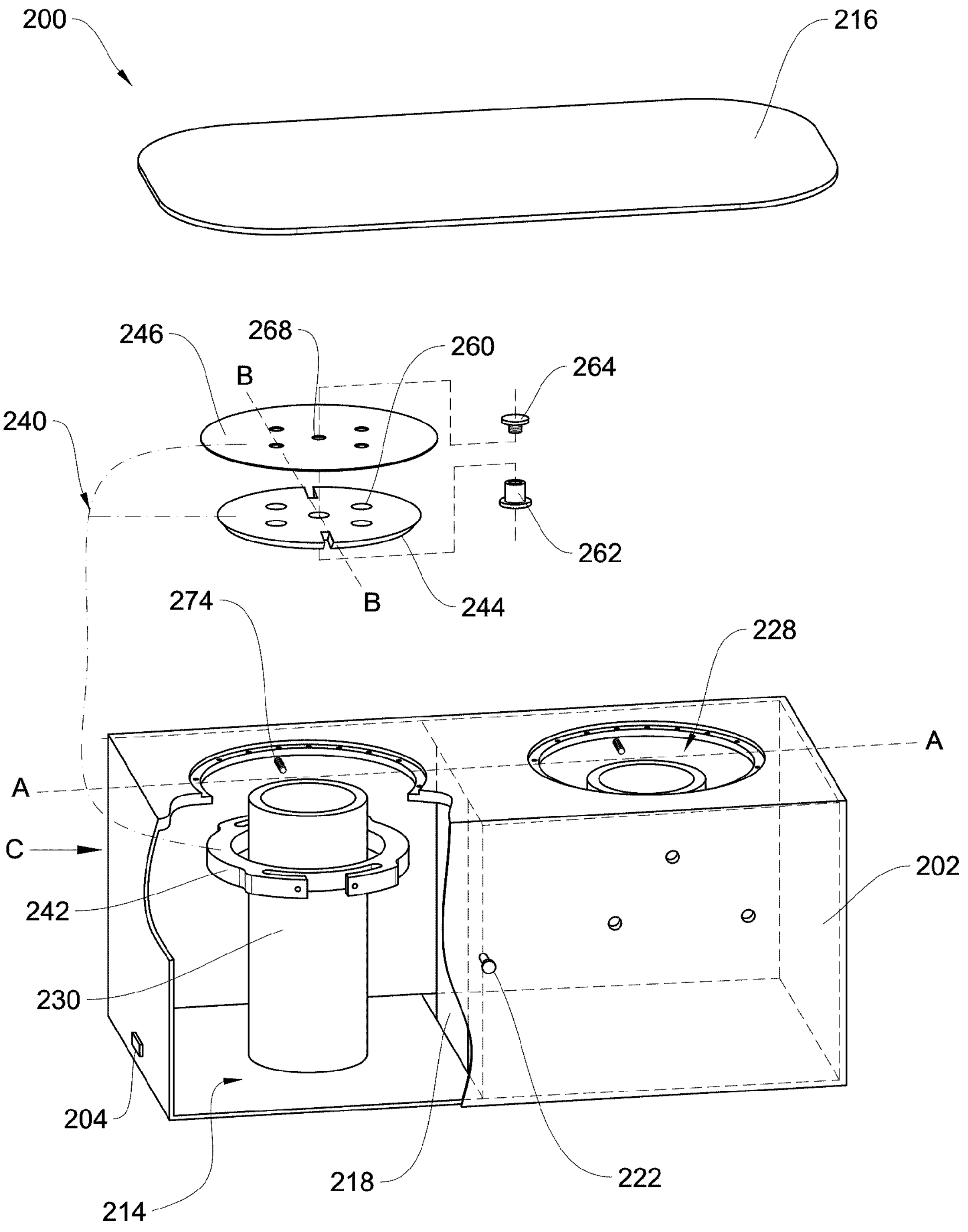
FIG. 3 shows in a perspective view a disassembled radio frequency device (e.g., a filter) that has a two-chamber casing shown in FIG. 2, with part of the side walls cut away and the top wall raised to show its inner structure.

Reference is now made to FIG. 2 and FIG. 3, which illustrate a radio frequency device 200 such as a filter, a combiner or a resonator that has an electrically conductive casing 210. The casing has wall or walls which define a closed space or an enclosed cavity 202. In the example shown in FIG. 2, the conductive casing 210 has sidewalls 212, a bottom wall 214 and a top wall 216, together defining the enclosed cavity 202. Of course, it is understood that the casing may have any suitable shape, such as cylindrical, and therefore may have only one sidewall that is cylindrical, or may even have only one integral wall enclosing the entire enclosed cavity 202. A pair of input/output ports 204 (only one is shown in FIG. 2) are disposed on a wall or walls, such as the sidewalls, for connection to radio signal sources.

The radio frequency device 200 may have one or more inner dividers to divide the enclosed cavity 202 into several inner chambers 206. The inner divider may be a dividing wall and there may be several dividing walls. In the example shown in FIG. 2 and FIG. 3, a dividing wall in the nature of a dividing plate 218 divides the enclosed cavity 202 into two separate internal chambers 206. The dividing plates may be conductors. An aperture or a port is provided in the dividing wall for coupling of electromagnetic energy between neighboring chambers. The aperture may be formed in any suitable manner as long as it can facilitate the coupling of electromagnetic energy between neighboring chambers. In the example shown in FIG. 2 and FIG. 3, this aperture is provided in the form of a gap 220 between a side of the dividing plate 218 and a side wall 212 of the casing 210. To enable easy tuning of the coupling, a tuning screw 222, retractably extended into the aperture such as the gap 220 and threaded through and therefore supported by a threaded hole 224 formed on the side wall, is provided. Turning the screw will move the screw further into or withdraw it away from the gap and thus changes the coupling of electromagnetic energy between neighboring chambers. An upper support plate 226 is secured to the sidewalls below and adjacent to the top wall 216. The upper support plate 226 has one or more top apertures 228, each corresponding to one internal chamber 206 in the enclosed cavity. The edge of the aperture thus provides a brim for supporting a covering plate as will be further described in detail.

The conductive casing 210 (including its side walls, bottom wall and top wall), the dividing plate, and the upper support plate 226, are all made of conductive materials, such as metal, and are all electrically connected together to form one conductive body, for example by securing together using metal screws and making electrical contact at contacting surfaces.

Figure 4:
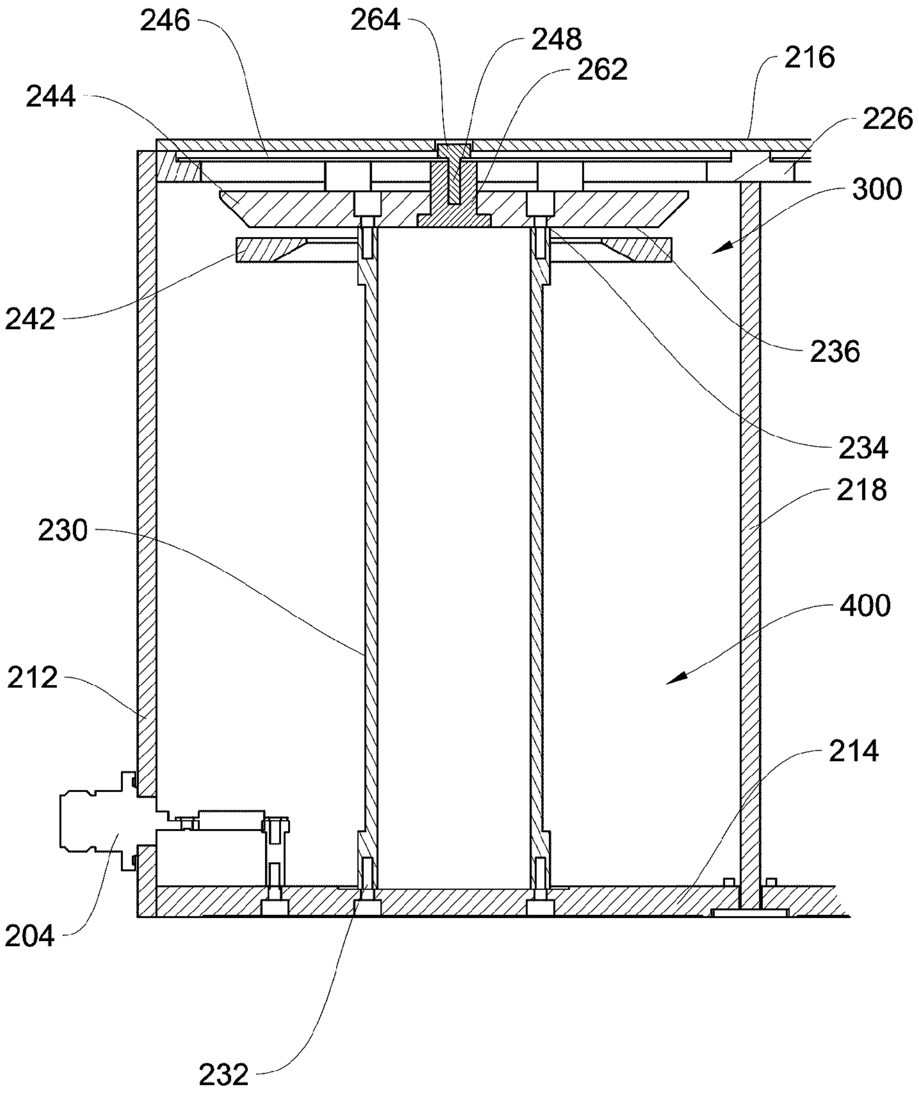
FIG. 4 is a cross-sectional view showing half of an assembled radio frequency device shown in FIG. 3, with the cross-section taken along the line A-A in FIG. 3.

Referring to FIG. 3, the radio frequency device 200 has an inner post 230, disposed inside the casing 210. When the enclosed cavity 202 is divided into multiple inner chambers 206, in general, each inner chamber has an inner post 230 disposed therein. In the example shown in FIGS. 2 to 5, the cavity 202 is divided into two inner chambers 206 and the radio frequency device has two inner posts 230, each disposed inside one inner chamber. Referring to FIG. 4, the inner post 230 has a bottom end 232 and a top end 234, opposite the bottom end. The inner post 230 is secured at its bottom end 232 to bottom wall 214 of casing 210. The inner post 230 is dimensioned such that it is entirely enclosed in the cavity 202 and its top end is spaced from and below the upper support plate 226, such that the top end 234 of the inner post 230 makes no electric contact with the casing 210. Thus, the casing 210 and the inner post 230 form an electric short circuit at the bottom (i.e., at the bottom end 232) and form an open electric circuit at the top of the inner post 230 (here, "top" is the end of the inner post 230 opposite the bottom end 232).

In general, inner post 230 and side walls 212 may be made of different metals having different coefficients of thermal expansion (CTE). For example, side walls 212 may be made of a first material such as aluminum having a linear CTE of about 23.1 ppm/° C. at 20° C. and inner post 230 may be made of a second material such as copper having a CTE of about 17 ppm/° C. at 20° C., smaller than that of aluminum. As a result, the sidewalls will have larger linear expansion due to temperature increase or decrease than the inner post, a thermal property which will be utilized for temperature compensation as will be described in great detail.

Figure 6:
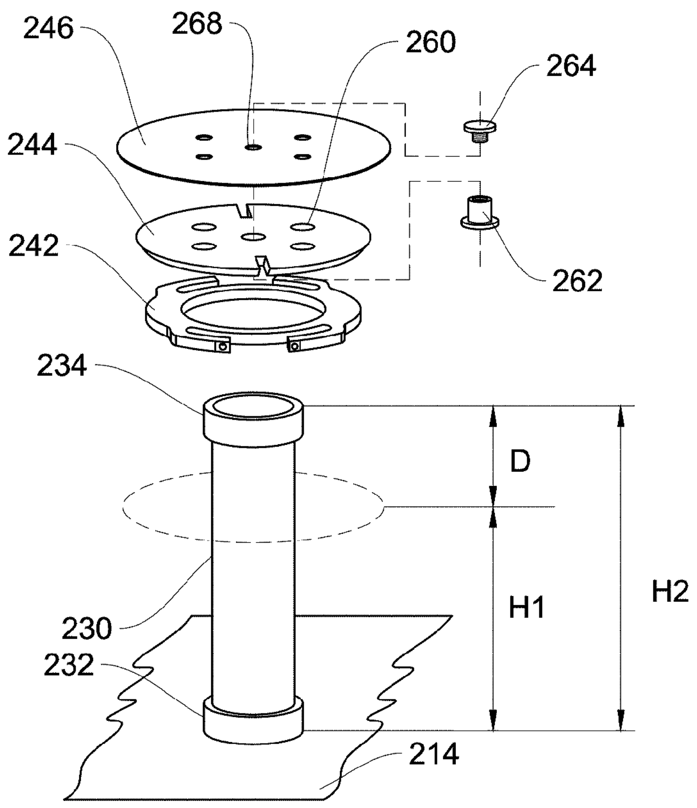
FIG. 6 shows in a perspective view several parts of the temperature compensation structure shown in FIG. 3, with most of the surrounding parts removed for better illustration.
Figure 8:
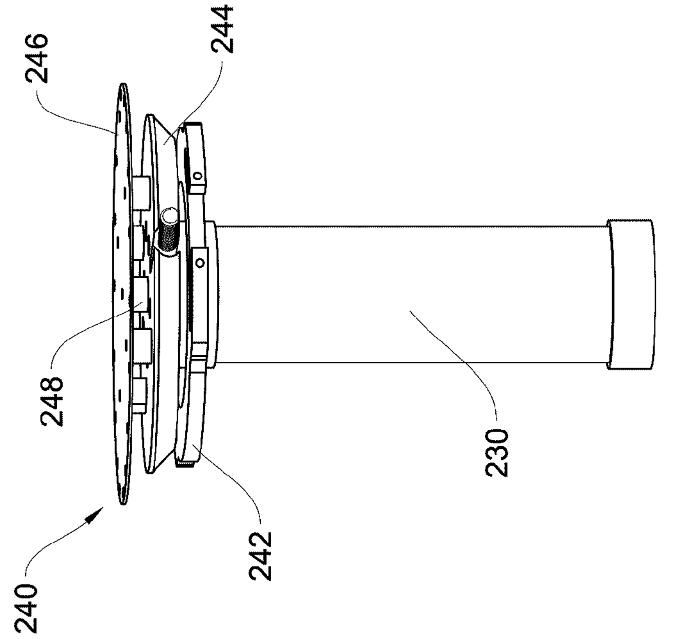
FIG. 8 shows in a perspective view a temperature compensation structure and inner post of the radio frequency device shown in FIG. 3, to more clearly illustrate the spatial relationship between various parts of the temperature compensation structure and the inner post.

Also located inside the chamber 206 and near the top end of inner post 230 is a temperature compensation structure 240 (see FIGS. 3 and 8 and also FIG. 6). The temperature compensation structure 240 includes a lower conductor plate 242, a middle conductor disk 244, an upper conductor plate in the nature of a covering plate 246, and one or more dielectric blocks 248, as further described below.

Figure 9:
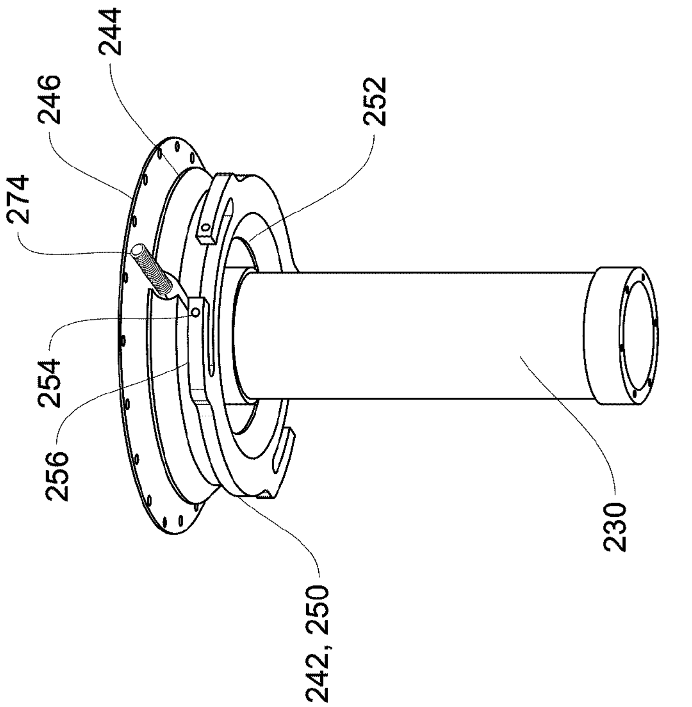
FIG. 9 shows in another perspective view the temperature compensation structure and inner post shown in FIG. 8.

Lower conductor plate 242 is disposed below the top end of the inner post 230, and inside the space between the inner post 230 and sidewall(s) 212. The lower conductor plate 242 may be made of a metal and is secured to the sidewall 212, for example by securing screws. Conveniently, the lower conductor plate 242 may take a generally annular shape such as an annular plate 250 having a central hole 252 (as indicated more clearly in FIG. 9). The annular plate 250 may have formed thereon one or more threaded holes 254 for receiving securing screws. Several anchor arms 256 may be formed and extending from the outer perimeter of the annular plate 250, so that threaded holes 254 may be formed on the anchor arms 256, to facilitate attaching the annular plate 250 to a sidewall or sidewalls 212. The annular plate 250 is secured to the sidewalls 212, at a height between the top end and bottom end of the inner post 230, near the top end but at some distance below the top edge of the inner post 230. The inner post 230 passes through the central hole 252 of the annular plate 250 without making any contact between the inner post 230 and the central hole 252.

Figure 5:
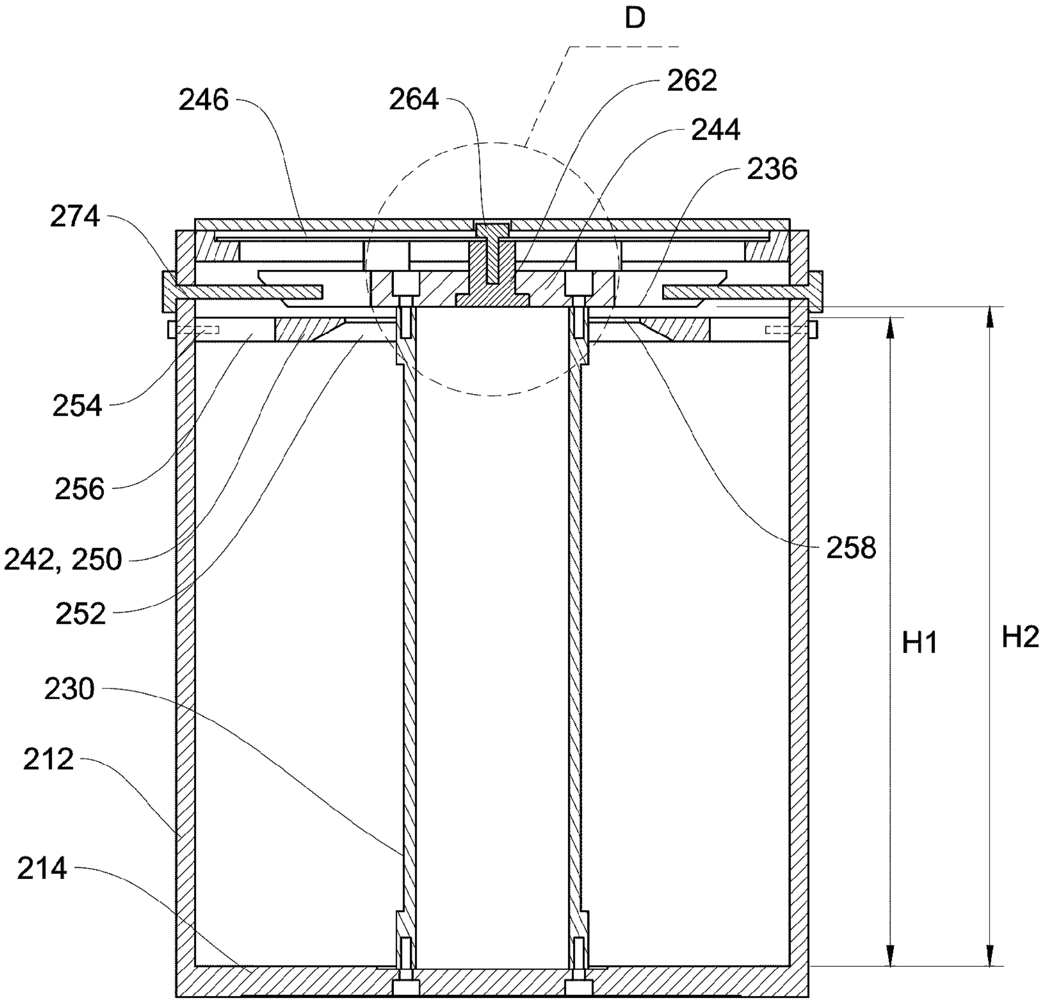
FIG. 5 shows in another cross-sectional view of the assembled radio frequency device shown in FIG. 3, with the cross-section taken along the line B-B and viewed in direction C indicated in FIG. 3.

As indicated in FIG. 5 and FIG. 6, the upper surface 258 of annular plate 250 is located below the top end 234 of the inner post, for example by selecting an attachment location of the annular plate where it is attached to the side wall at a height below the top end. The upper surface 258 is at a height of H1 from the bottom wall 214 (which may be selected by selecting an attachment location) and defines a boundary dividing the chamber 206 into an upper volume 300 and a lower volume 400. The inner post 230 has a length or height H2, which is larger than H1. The middle conductor disk 244, being secured to the top end 234 of the inner post 230, has its lower surface 236 also at the height H2 from the bottom wall 214.

The middle conductor disk 244 is a relatively thick disk and may be made of metal, thus having sufficient strength to withstand heating in a typical working environment of a radio frequency device without suffering any discernable deformation caused by the heating. Suitably, the middle disk is selected from a metal material such as copper and a disk thickness such that the middle disk substantially retains its flatness in the temperature range from −80° C. to +150° C. The middle conductor disk 244 is secured to the top end 234 of the inner post, for example, by a set of screws which may be metal screws. The middle conductor disk 244 is also dimensioned such that when secured to the inner post 230, there is no physical contact (and therefore also no electrical contact) between the middle conductor disk 244 and the sidewalls 212 (or any part of the casing 210). The gap between the lower surface 236 of the middle disk 244 and the upper surface 258 of the annular plate 250 is thus D=H2−H1.

Reference is now made to FIGS. 3 to 6. The middle disk 244 has one or more holes 260 formed thereon. Each of the holes 260 may be a through hole or may be a recessed hole or cavity. As most clearly seen in FIG. 3, there are five such holes. Partially located in each hole is a dielectric block 248, which may be in the nature of a Teflon nut 262 (and optionally, a corresponding Teflon screw 264). Teflon nut 262 is sized slightly larger than hole 260 such that the Teflon nut 262 is tightly seated within and fictionally held by interior wall of the hole 260. The Teflon nut 262 may also include an enlarged head 266 for more securely retaining the nut inside the hole 260. Because of the tight fitting, any heat expansion of the Teflon nut 262 is also restricted by the dimension of the hole. Additionally, when heated, lateral heat expansion of the middle disk 244 will slightly shrink the size of the hole and thus compress the portion of the Teflon nut 262 embedded inside the hole 260.

Figure 7:
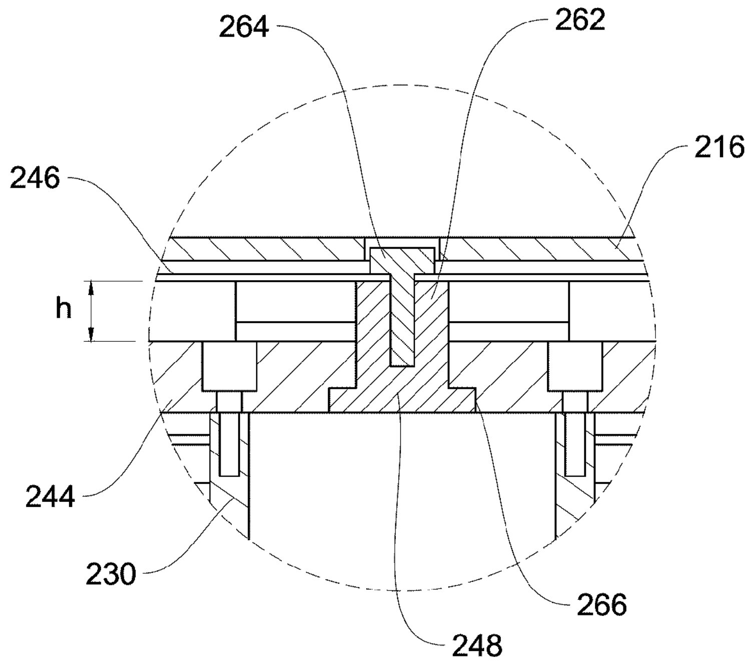
FIG. 7 is a cross-sectional view showing the region D indicated in FIG. 5 in an enlarged view.

Reference is now made to FIG. 7. A significant portion of the dielectric block is embedded in the middle disk 244. The middle disk 244 is sufficiently thick so that the portion of dielectric block 248 held by the middle disk 244 inside the hole 260 (i.e., an embedded portion) tends not able to expand its volume when heated. Instead, due to the Teflon (or any suitably selected dielectric material) being sufficiently ductile, the portion of the dielectric block 248 outside the middle disk 244 (the non-embedded portion) tends to experience enhanced heat expansion in volume due to the volume embedded inside the middle disk 244 (the embedded portion) being held almost constant (or even decreased). This enhanced volume expansion may be measured by a ratio of the volume of the dielectric block embedded inside the middle disk 244, denoted as V1 (the volume of the embedded portion), and the volume of the dielectric block exposed outside the middle disk 244, denoted as V2 (the volume of the non-embedded portion). In general, this ratio, V1:V2, is selected to be around or greater than 1 for a more discernible enhancement, though it is found that V1:V2$\gtrsim$0.8 (or at least 0.5:1) may already produce desired enhancement. As will be appreciated, Teflon has a CTE value much larger than that of metal, including aluminum and copper, and thus the heat expansion in volume of the non-embedded portion can be quite significant. Selection of any other dielectric materials with sufficiently large CTE values and sufficiently ductile may promote the effect of the enhanced volume expansion, and thus the compensation effect provided by the dielectric blocks. Furthermore, as will be appreciated, if the hole 260 is a recessed hole or cavity, such restriction in volume expansion to embedded portion tends to be more profound which leads to more enhanced volume expansion, too.

The covering plate 246 may be a metal plate. It is secured to the upper support plate 226 by a set of screws around its periphery. Although in general the covering plate 246 is sized such that it completely covers and therefore seals the opening 228 of the upper support plate 226, the complete covering is not strictly necessary as long as the covering plate is electrically connected to the casing 210, for example by making good electric contact with the upper support plate 226. Covering plate 246 is also attached to the dielectric blocks 248, for example by screws 264 threaded into the Teflon nuts 262 and tightened to keep the covering plate 246 tightly attached to each of the Teflon nuts 262. Thus, the Teflon nuts and the screws join the covering plate 246 to the middle disk 244. The securing screws tightly secure the covering plate 246 to the Teflon nut 262, so that when the Teflon nuts expand or contract due to variation in ambient temperature, the covering plate 246 moves with the Teflon nuts. The covering plate 246 is sufficiently thin so that it may be deformed to accommodate the expansion and contraction of the Teflon nuts along the longitudinal direction of the inner post, instead of restricting its expansion or contraction. The Teflon nuts keep the covering plate 246 and the middle disk 244 spaced apart at a distance determined by the exposed portion of the Teflon nuts, i.e., distance h (see FIG. 10).

Figure 11:
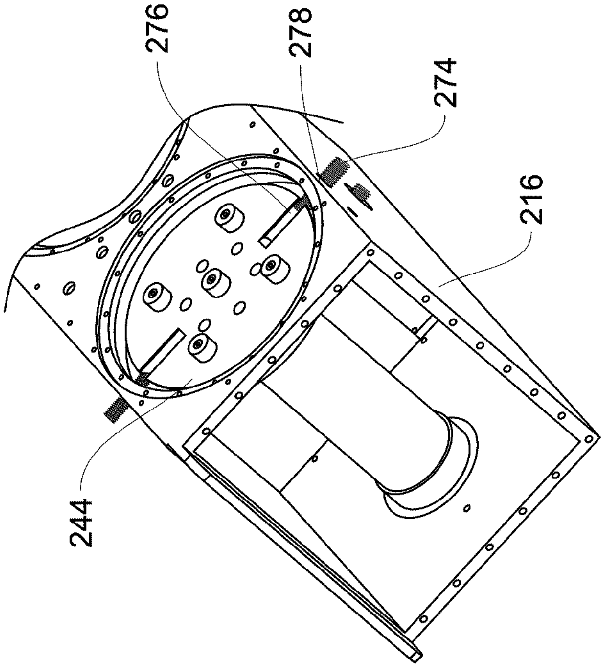
FIG. 11 shows in another perspective view the tuning screws and tuning slots formed on the middle disk in an assembled state.
Figure 10:
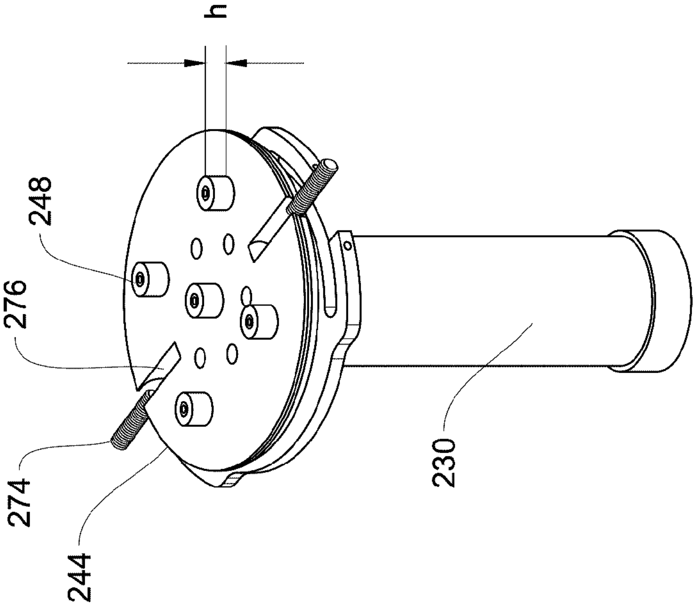
FIG. 10 shows in a perspective view the details of tuning screws and tuning slots formed on the middle disk.

Reference is now made to FIGS. 10 and 11. Formed on the middle disk 244 are two tuning slots 276 extending inward from the perimeter of the middle disk toward its center. Extending into each tuning slot 276 is a tuning rod in the nature of a tuning screw 274 threadedly mounted to a side wall of the casing, such as threaded through a threaded hole 278 formed on a side wall 212 of the casing 210. The tuning screw 274 may be made of metal. It is supported on and making electric contact with casing 210 but does not make physical or electrical contact with the middle disk 244 or the slot 276. Turning the metal tuning screw 274 moves the tuning screw 274 into or out of the tuning slot 276 along its length, thus tuning the value of resonance frequency (or a center frequency of working frequency band) of the radio frequency device.

When temperature varies, the casing, the inner post, the dielectric blocks and other parts of this temperature compensation structure will cause different frequency drifts due to thermal expansion effects. The dimensions, locations and materials are carefully selected so that these frequency drifts will cancel each other, or compensated, to stabilize the resonate frequency.

In general, as temperature rises, the volume enclosed in the cavity 202, including the upper volume 300, will increase (and vice versa). This increase in volume will cause a frequency drift. Further, because the CTE values of inner post 230 (made of copper) and casing 210 (made of aluminum) are different, and in particular, because the CTE value of copper is smaller than the CTE value of aluminum, the upper volume will increase more than it would otherwise based on ratio between the lengths of the inner post 230 and the height of sidewalls 212 alone. This further enhances the effect of volume increase. This increase in enclosed volume due to heat expansion will shift the resonant frequency. This overall frequency change (when temperature rises) is denoted as DF_0.

As noted, both the inner post 230 and side wall 212 increase in length as temperature rises due to heat expansion. The middle disk 244 is secured on top of the inner post 230 and therefore its new location is determined by the expanded length of the inner post 230 (originally at H2). The annular plate 250 is secured to the side wall 212 at an original distance H1 from bottom and therefore its new location is determined by the expanded distance due to expansion of the side wall 212. Because the side wall 212 expands more due to its larger CTE value than the inner post 230, the distance between middle disk 244 and annular plate 250 may become smaller, by suitable selection of location H1 and length of inner post 230, H2.

When H2 and H1 are suitably selected, the distance between middle disk 244 and annular plate 250 decreases as temperature rises. The decreased distance between these two plates also will shift the resonant frequency. This frequency drift caused by decrease in distance between middle disk 244 and annular plate 250 (when temperature rises) will be denoted as DF_$m,\ell$.

As temperature rises, the Teflon nuts 262 (and the Teflon screws 264 threaded into Teflon nuts 262 if used) will have volume expansion due to heat expansion (and vice versa). Teflon is a dielectric material. This volume increase will increase the volume of dielectric material filled in between the covering plate 246 and middle disk 244. The total volume of the Teflon nuts and screws will experience a volume increase as dictated by their original volume and the volume CTE value of Teflon. The enhanced heat expansion due to part of the Teflon nut being prevented from expansion by the middle disk further promotes the volume expansion in the exposed space between the middle disk and the lower plate. This, coupled with the change in dielectric coefficient of Teflon due to temperature increase, causes another frequency drift. This frequency drift due to the dielectric material between middle disk 244 and covering plate 246 (e.g., the volume change, the change in dielectric coefficient) is denoted as DF_$d$.

As temperature rises, covering plate 246 will have lateral expansion, i.e., expansion along the radial direction. However, because the covering plate 246 is secured at its periphery to the outer cavity 202 at its top edge, the lateral expansion of covering plate 246 is limited by the securing screws at the perimeter. Due to the relative thin thickness, which can be carefully selected, the lateral heat expansion causes the covering plate 246 to bend. Because upward bending is restricted or prevented by the top wall 216, the pulling by the Teflon nuts and screws will dominate the direction of bending of the covering plate, which tends to pull the covering plate to bend inwardly towards the middle disk 244. This inward bending would reduce the effective distance between the covering plate 246 and middle disk 244 and cause a frequency drift. However, this inward bending and the consequent frequency drift is minimized.

Although not immediately obvious, but also assisting with the minimization of the frequency drift, is the removal of material from regions of the covering plate 246 to form the screw hole or holes 268 to allow securing screw(s) to pass through, for tightly securing the central region of the covering plate 246 to the middle disk 244. This removal has two consequences: 1) allowing lateral expansion into the screw holes 268 and thus minimizing the tendency of inward bending of the covering plate 246; 2) holding the covering plate 246 tightly to middle disk 244. The middle disk 244 is sufficiently thick and rigid and has minimal heat caused deformation. The additional four pairs of Teflon nuts 262 and screws 264 further hold the covering plate 246 to middle disk 244 to minimize deformation of the covering plate 246. Thus, the screw holes 268 and the five sets of Teflon nuts and screws between the covering plate 246 and middle disk 244 minimizes both the distance change and the distance variation between center and outer areas of the covering plate 246 caused by inward bending. This reduction can be optimally achieved by careful selection of the size of the screw holes 268 and their locations. Nevertheless, there may still be a small frequency drift due to inward bending of covering plate 246, even though minimized. This overall frequency drift caused by change in average distance between middle disk 244 and covering plate 246 will be denoted as $DF_{m,u}$.

Overall, one may carefully select the dimensions, locations and material properties, such that a combined frequency drift is minimized, $$\mathrm{Min}(DF_0,\ DF_{m,l},\ DF_{m,u},\ DF_d) \qquad \text{Eq (1)}$$

In other words, the DF_0 is compensated, and a minimized combination of frequency drift is achieved within a reasonable temperature range by careful selection of $DF_{m,l}$, $DF_{m,u}$, $DF_d$.

In addition, the tuning rods or tuning screws 274 introduce another frequency drift $DF_t$ as explained earlier. The tuning screws 274 are placed at a location and in a manner that partially minimize the frequency drift. First, the location of the tuning screws 274 are in the plane of the middle disk 244. This is a location where the electric field is relatively weak. As a result, any relative variation in dimension would not have a strong effect on resonant frequency. Thus, although temperature variation may similarly cause dimensional changes to the slot 276 and the tuning screw 274, the impact of such changes to resonant frequency is relatively small and may be neglected compared to dimensional changes in other parts. Second, any expansion of the tuning screw 274 caused by rising temperature, thus reduction in the air gap between the tuning screw 274 and the slot 276, would be partially balanced by misalignment between the tuning screw 274 and the slot 276 due to the plate plane being pushed away from the tuning screw by the inner post 230. Although $DF_t$ itself may be minimized, its residue still may be factored into the combined frequency drift of Eq(1) to further reduce the combined frequency drift.

Therefore, by suitably selecting:

1. height of annular plate 250 at the side walls 212, i.e., H1
2. the material of the inner post 230 (i.e., its CTE value) in relation to the material of the outer cavity 202 and the length of inner post 230 (H2),
3. the volume of the dielectric blocks, i.e., sizes of Teflon nuts and screws, their CTE value and their thermal dielectric properties (e.g., change in dielectric coefficient),
4. distance between the covering plate 246 and middle disk 244 (i.e., the height h of the Teflon nut above the upper plate, and the distance between the top of the inner post 230 and the upper edge of the side walls 212),
5. the location of the tuning mechanism (tuning screws 274 and tuning slots 276) and their structural construction (spatial relationship), the frequency drift of the resonator or cavity due to temperature variation can be compensated and minimized.

Of course, careful selection of the location of the tuning mechanism (tuning screws 274 and tuning slots 276) and their structural construction (spatial relationship), the frequency drift of the tuning mechanism itself also may be minimized. Further, by removing portions of covering plate 246 (i.e., forming the screw holes 268) and tightly joining covering plate 246 to middle disk 244, the bending effect of the covering plate 246 can be reduced and thus further minimize the frequency drift due to temperature change.

Various examples of practicing the invention have now been described in detail. Those skilled in the art will appreciate that numerous modifications, adaptations and variations may be made to the examples without departing from the scope of the invention, which is defined by the appended claims. The scope of the claims should be given the broadest interpretation consistent with the description as a whole and not to be limited to these examples set forth in the examples or detailed description thereof.

What is claimed is:

1. A radio frequency device that includes a temperature compensation structure for minimizing thermal frequency drift, the radio frequency device comprising:

a casing made of a first conductive material of a first coefficient of thermal expansion (CTE) value, the casing having a bottom wall, a top wall and one or more side walls between the bottom wall and the top wall to form an enclosed cavity, an inner post made of a second conductive material of a second CTE value disposed inside the enclosed cavity, the inner post having a bottom end and a top end opposite the bottom end, the inner post being attached and electrically connected to the bottom wall at the bottom end, the top end being electrically disconnected from the casing, and the temperature compensation structure arranged at the top end of the inner post and disposed inside the enclosed cavity, the temperature compensation structure comprising:

a lower plate secured to and electrically attached to at least one side wall of the one or more side walls and at a height between the top end and the bottom end, the lower plate making no contact with the inner post;

a middle disk secured to and electrically attached to the top end of the inner post, a covering plate securely attached around its periphery to the casing, and one or more dielectric blocks joining the middle disk to the covering plate, each one of the one or more dielectric blocks being partially embedded in the middle disk and having a non-embedded portion separating the middle disk from the covering plate at a gap distance, wherein a change in volume due to heat expansion of the partially embedded portion of the one or more dielectric blocks inside the middle disk is restricted by the middle disk, and wherein a volume ratio of the partially embedded portion to the non-embedded portion of the one or more dielectric blocks is at least 0.5:1, and wherein the lower plate, the middle disk and the covering plate are electrically conductive.

2. The radio frequency device of claim 1, further comprising:

one or more inner dividers, the one or more inner dividers dividing the enclosed cavity into a plurality of inner chambers, the inner post and the temperature compensation structure being disposed in the first of the plurality of inner chambers, the inner post disposed in the first of the plurality of inner chambers being a first inner post and the temperature compensation structure disposed in the first of the plurality of inner chambers being a first temperature compensation structure, each inner divider of the one or more inner dividers having a port connecting the neighboring inner chambers separated by the each inner divider for coupling electromagnetic energy in the neighboring chambers.

3. The radio frequency device of claim 2, wherein the one or more inner dividers are conductive.

4. The radio frequency device of claim 2, wherein the radio frequency device comprises:

a plurality of the inner posts, the first inner post being one of the plurality of the inner posts, and a plurality of the temperature compensation structures, the first temperature compensation structure being one of the plurality of the temperature compensation structures, each inner chamber of the plurality of inner chambers having disposed therein one of the plurality of the inner posts and having one of the respective temperature compensation structures disposed therein and arranged at or in the vicinity of the top end of the one inner post, each inner post disposed in the respective each inner chamber being attached and electrically connected to the bottom wall at the bottom end of the each inner post, the top end of the inner post being electrically disconnected from the casing, and each respective temperature compensation structure being arranged at the top end of the each inner post and disposed inside the enclosed cavity, the lower plate of the each temperature compensation structure being secured to and electrically attached to at least one side wall of the one or more side walls and at a height between the top end and the bottom end of the respective each inner post, the middle disk of the each temperature compensation structure being secured to and electrically attached to the top end of the respective each inner post, the covering plate of the each temperature compensation structure being securely attached around its periphery to the casing, and the one or more dielectric blocks of the each temperature compensation structure joining the middle disk to the covering plate, each one of the one or more dielectric blocks being partially embedded in the middle disk and having a non-embedded portion separating the middle disk from the covering plate at a gap distance, wherein the lower plate, the middle disk and the covering plate of the each temperature compensation structure are electrically conductive.

5. The radio frequency device of claim 4, further comprising a frequency tuning mechanism, the frequency tuning mechanism comprising at least one tuning rod movably supported by one side wall of the one or more side walls at a height of the middle disk, wherein at least one middle disk of the one or more middle disks has a corresponding tuning slot formed thereon and extending inwardly from its periphery, the at least one tuning rod being partially disposed in the respective corresponding tuning slot and movable along the length of the tuning slot.

6. The radio frequency device of claim 5, wherein each of the at least one tuning rods is a metal screw threadedly mounted to the side wall.

7. The radio frequency device of claim 1, wherein the volume ratio is at least 1:1.

8. The radio frequency device of claim 1, wherein the covering plate has a covering plate thickness and portions of the covering plate removed such that the covering plate is pulled by the dielectric blocks to deform and bend inwardly toward the inner post when the covering plate is heated.

9. The radio frequency device of claim 1, wherein the middle disk has a disk thickness such that the middle disk retains its flatness in the temperature range −80° C. and +150° C.

10. The radio frequency device of claim 1, wherein the dielectric blocks are made of a dielectric material that has a CTE value larger than that of the middle disk.

11. The radio frequency device of claim 1, wherein the first conductive material is aluminum and the second conductive material is copper.

12. The radio frequency device of claim 1, further comprising a frequency tuning mechanism, the frequency tuning mechanism comprising at least one tuning rod movably supported by one side wall of the one or more side walls at a height of the middle disk, wherein at least one middle disk of the one or more middle disks has a corresponding tuning slot formed thereon and extending inwardly from its periphery, the at least one tuning rod being partially disposed in the respective corresponding tuning slot and movable along the length of the tuning slot.

13. The radio frequency device of claim 12, wherein heat expansion of volume of the partially embedded portion of the one or more dielectric blocks inside the middle disk is restricted by the middle disk.

14. The radio frequency device of claim 13, wherein the dielectric blocks are made of a dielectric material that has a CTE value larger than that of the middle disk.

15. A radio frequency device that includes a temperature compensation structure for minimizing thermal frequency drift, the radio frequency device comprising:

a casing made of a first conductive material of a first coefficient of thermal expansion (CTE) value, the casing having a bottom wall, a top wall and one or more side walls between the bottom wall and the top wall to form an enclosed cavity, an inner post made of a second conductive material of a second CTE value disposed inside the enclosed cavity, the inner post having a bottom end and a top end opposite the bottom end, the inner post being attached and electrically connected to the bottom wall at the bottom end, the top end being electrically disconnected from the casing, and the temperature compensation structure arranged at the top end of the inner post and disposed inside the enclosed cavity, the temperature compensation structure comprising:

a lower plate secured to and electrically attached to at least one side wall of the one or more side walls and at a height between the top end and the bottom end, the lower plate making no contact with the inner post;

a middle disk secured to and electrically attached to the top end of the inner post, a covering plate securely attached around its periphery to the casing, and one or more dielectric blocks joining the middle disk to the covering plate, each one of the one or more dielectric blocks being partially embedded in the middle disk and having a non-embedded portion separating the middle disk from the covering plate at a gap distance, and a frequency tuning mechanism, the frequency tuning mechanism comprising at least one tuning rod movably supported by one side wall of the one or more side walls at a height of the middle disk, wherein at least one middle disk of the one or more middle disks has a corresponding tuning slot formed thereon and extending inwardly from its periphery, the at least one tuning rod being partially disposed in the respective corresponding tuning slot and movable along the length of the tuning slot, wherein the lower plate, the middle disk and the covering plate are electrically conductive.

16. The radio frequency device of claim 15, wherein heat expansion of volume of the partially embedded portion of the one or more dielectric blocks inside the middle disk is restricted by the middle disk.

17. The radio frequency device of claim 16, wherein the dielectric blocks are made of a dielectric material that has a CTE value larger than that of the middle disk.

* * * * *